United States Patent [19]

Berger et al.

[11] 4,018,960
[45] Apr. 19, 1977

[54] BELTING FOR SAFETY BELTS

[76] Inventors: Johann Berger, Gutenbergstr. 48/1;
Josef Berger, Karl-Lullig-Str. 59,
both of 707 Schwabisch Gmund,
Germany

[22] Filed: Sept. 24, 1975

[21] Appl. No.: 616,304

[30] Foreign Application Priority Data

Oct. 1, 1974  Germany .......................... 2446837
Feb. 28, 1975  Germany .......................... 2508732
May 13, 1975  Germany .......................... 2521124

[52] U.S. Cl. ................................. 428/193; 428/36;
428/192; 428/212; 428/258
[51] Int. Cl.² .......................................... B32B 3/02
[58] Field of Search ............ 428/36, 192, 193, 212,
428/258

[56] References Cited

UNITED STATES PATENTS 2,064,781  12/1936  Collins .......................... 428/258 X Primary Examiner—Mayer Weinblatt
Attorney, Agent, or Firm—Cushman, Darby & Cushman

[57] ABSTRACT

Belting for safety belts, particularly for vehicles, having at least one side margin comprising an externally rounded protective profiled element, this element preferably being in the form of a tube. The belting, including said elements, may be woven in one piece. The warp threads in the woven tubular element preferably have a higher coefficient of elongation at break than those of the belt portion, so that under load they will not break before the warp threads of the belt portion. In order to achieve this, the warp threads of the woven tubular element may be shrunk before weaving.

15 Claims, 10 Drawing Figures

BELTING FOR SAFETY BELTS

The invention relates to belting for safety belts. An important field of application comprises safety belts for vehicles, including aircraft. Other fields of application comprise safety belts for climbers and also for engineers and craftsmen working on multistory buildings, particularly seat belts.

Known safety belting is produced by weaving, thereby entailing the disadvantage that the belting has undulating side edges. These undulating side edges of the belting lead to chafing of the clothing of a person wearing the belt. In the case of safety belts for vehicles this chafing action is intensified by the use of winding devices for the safety belt, because under the spring tension of the winding device the belt always lies closely against the clothing. Moreover, the side edges of such belts can give rise to injury from cuts in the event of an accident because said side edges act like a saw.

Even by refining known weaving techniques it is never possible to produce belting having smooth side edges which are entirely free from roughness. Furthermore, because of the weaving process, the side edges of the belting tend to be angular in cross-section, whereas for the reasons given above rounded edges would be more desirable.

The present invention seeks to reduce and if possible entirely eliminate the aforesaid disadvantages.

The present invention provides belting for safety belts, at least one side margin of the belting comprising a protective profiled element which extends longitudinally thereof.

The said profiled element thus provides a protective margin which extends laterally of the adjacent side edge of the belt portion and which is capable of reducing or eliminating the chafing or sawing action of the woven edge of the belt portion.

Preferably said element has a cross-section which is rounded at least over that part of its periphery which does not abut the belt portion of the belting.

If the said element has a thickness which is no greater than the thickness of the belt portion and if the protective profiled element projects only laterally of the belt portion (e.g., if the longitudinal axis of the protective profiled element lies approximately in the transverse central plane of the belt portion), it will also be possible for safety belts having profiled elements according to the invention to be wound-up in winding devices, without the functioning of the latter being adversely affected.

A particularly soft protective profiled element is obtained when the element is in the form of a tube.

The protective profiled element may be a pre-formed element fastened, for example by welding or sewing, to a side edge of the belt portion. It is however particularly advantageous and economical to form said element integrally with the belt portion, particularly in the form of a woven tube having weft threads in common with the belt portion. Belting of this kind then comprises a belt portion which extends over the greater part of the width of the belting and which has one, and preferably two, woven tubular margins.

Thus, not only the belt portion but also the said elements are produced by weaving. A normal loom can be used for this purpose. It is also possible to use needle belt weaving machines, particularly those having a catch thread spool. By means of a suitable weave it is possible to produce at the side margins of the belting two superimposed bands which are joined together at their outer edges and which thus form a tube.

A particularly suitable weave for said elements is one wherein $\frac{3}{1}$ alternates with $\frac{1}{3}$.

Belting having an integral woven tubular margin has the advantage that overstretching as the result of an accident will be visible. After overstretching, the belting will partly but not completely retract. The woven tubular margin will thus become substantially looser. Compared with the woven tubular margin of belting which has not been overstretched, it will be more undulating. This difference will be perceptible to the specialist (e.g., materials testing institute or specialist workshop). It can thus be ensured that belts which have once been overstretched in an accident will not be used again.

A particularly soft margin is obtained if the said woven element has a lower weft density than the belt portion, e.g., has half the weft density of the belt portion. Thus each weft thread may extend in the normal manner through the belt portion, but in the said element may pass through only one of said superimposed bands, where it will be interwoven with warp threads. The belt portion may have a $\frac{2}{2}$ weave with single weft insertion per shedding, which in the case of a needle belt weaving loom will mean one to-and-fro movement of the needle.

If the abrasion resistance of a said element of this kind is not sufficient, the element may be given the same weft density as the belt portion. With the previously mentioned weave for the said element, this can be achieved by giving the belt portion a $\frac{4}{4}$ weave with double weft insertion per shedding. In needle belt weaving machines this will mean two to-and-fro movements of the needle per shedding. One and the same shed is thus used for the belt portion, while wefts are inserted in two different sheds for the said element. A weft which forms part of one of said superimposed bands therefore runs first through the shed for the belting portion. The shed is then changed only for the said element, and thereupon a weft is inserted for the other of said superimposed bands, which is inserted through the unchanged shed for the belt portion. Only thereafter is a new shed formed for both the belt portion and said element. In the case of a weaving machine provided with shuttles, the shuttle therefore runs once forwards and once back with unchanged shed adjustment for the belt portion. In a needle belt weaving machine the needle runs to-and-fro twice with the adjustment unchanged.

The warp threads of the said element may be finer than those of the belt portion.

If the warp thread material of the belting is to be utilised in optimum manner, it must be ensured that the warp threads of the belt portion and those of the said element will break under the same breaking load. If for example the threads of the said element were to break at a lower breaking load than those of the belting portion, the belting as a whole would be weakened because a smaller number of warp threads, that is to say only the warp threads of the belt portion, would then have to take the entire load. Consequently, the belt as a whole would break at a lower breaking load than if all threads could withstand the same load.

Weaves of different weft densities in the said element and in the belt portion mean that in a predetermined length of belting the warp threads in the belt portion will have a greater actual length than in the said element. By "actual length" should here be understood, in a manner of speaking, the developed length of the threads. This length can be measured by cutting-off a piece of belting of predetermined length, separating the warp threads from the weft threads, and then straightening the warp threads without stretching them. With half the weft density in the said element, the warp threads of the belt portion can, for example, be about 7% longer than the warp threads of the said element. This is simply because the warp threads of the belt portion are interwoven with, and therefore extend partially around, twice as many weft threads as the warp threads of said element. The same effect occurs, although to a smaller extent, in belting having the same weft density in both the belt portion and said element.

It is therefore preferable to ensure that the warp threads of said element and the warp threads of the belt portion break as far as possible at the same breaking load. Thus preferably the coefficient of elongation at break of the warp threads of the said element are higher by a percentage $a$ than the coefficients of elongation at break of the warp threads of the belt portion, and the percentage $a$ is at least substantially equal to a percentage $b$ by which in a predetermined length of belting the actual lengths of the warp threads of the belt portion are greater than the actual lengths of the warp threads of the said element.

Warp threads having different coefficients of elongation at break are therefore used. By "coefficient of elongation at break" is here understood the percentage increase in length of a thread occurring when the thread is elongated until it breaks. The warp threads of the said element should have a higher coefficient of elongation at break than those of the belt portion. In the example mentioned above, where there is a difference in actual length of 7%, the warp threads of the said element should have a coefficient of elongation at break which is 7% higher than that of the belting portion. The warp threads of the said element are thus able to stretch to a greater extent before they break than the warp threads of the belt portion. The difference in length mentioned above can accordingly be compensated for.

It is possible to use for the warp threads threads supplied by thread manufacturers with suitable different coefficients of elongation at break. If however threads having such suitable coefficients of elongation at break are not obtainable as may sometimes be the case, then the belt portion and said element may be woven from warp threads whose coefficients of elongation at break originally differed by a percentage different from the percentage $b$, but which, before weaving have been treated by so shrinking the warp threads of the said element and/or so stretching the warp threads of the belt portion that the resulting coefficients of elongation at break of the warp threads of the said element are greater than those of the warp threads of the belt portion by at least substantially the percentage $b$.

If, for example, the coefficient of elongation at break of the warp threads of the said element is higher than that of the warp threads of the belt portion, but only by too low a percentage, the coefficient of elongation at break of the warp threads of the said element can be increased by shrinking them by a corresponding differential percentage before the weaving process. If a warp thread of the said element is shrunk, for example, by 4% it is thereby enabled to expand subsequently by 4% more than if it had not been shrunk.

Instead of shrinking the warp threads of the said element, the warp threads of the belt portion may conversely be stretched, or both measures could be combined.

It should be observed that, before weaving, shrinking may be effected only to such an extent that adequate shrinkability for the fixing of the finished belting should still be possessed both by the said element and by the belt portion.

Instead of shrinking the warp threads of the said element and/or stretching the warp threads of the belt portion, the warp threads, or the plys thereof, i.e., the yarns or twists from which the thread is made, of the said element may have a different, e.g., greater, degree of twist to the warp threads, or the plys thereof, of the belt portion, the differences in the degrees of twist being such as to provide said different coefficients of elongation.

It has been found that, when a safety belt has been in use for a long period of time, the coefficients of elongation at break of the warp threads are reduced in the side margins thereof, that is to say in the present case the coefficients of elongation at break essentially of the warp threads of the said element are in time reduced through wear. This undesirable effect can be compensated by additionally making the coefficients of elongation at break of the warp threads of the said element greater than those of the belt portion by a small percentage from the outset than would otherwise be necessary, this if necessary being done by one of the methods mentioned above.

The invention will be further described with reference to the accompanying drawings, in which:

FIG. 6 is a plan view, greatly enlarged, of a portion of one margin of belting according to another embodiment of the invention, while

FIG. 1 shows a belting 1 in which the weaving process has produced intensive undulation of the side edges 3.

Figure 1:
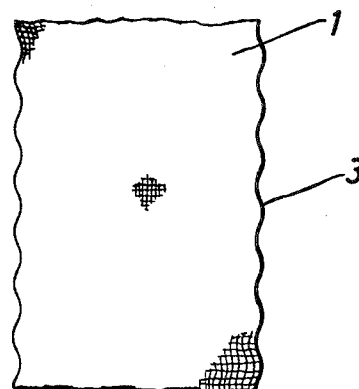
FIG. 1 shows a portion of known belting.
Figure 2:
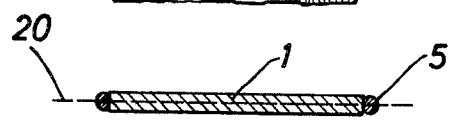
FIG. 2 is a cross-section through belting according to the present invention provided with protective profiled elements at its side margins (the thickness of the belting being shown exaggerated in relation to its width).
Figure 3:
FIGS. 3 to 5 show greatly enlarged cross-sections through the protective profiled elements of belting according to various embodiments of the invention.
Figure 5:

FIG. 2 shows that both side margins of the belting 1 according to the invention comprise a protective profiled element 5. This protective profiled element may be of various shapes. As shown in FIGS. 2 and 3, for example, it may consist of a monofilament and be circular in shape. It is however also possible to use multifilaments, for example cords. As shown in FIG. 5, the protective profiled element 7 may be flattened on one side, so that it can lie satisfactorily against the adjacent side edge of the belt portion. Other cross-sectional shapes are also suitable, provided that they have no outwardly directed sharp edges.

Figure 4:

FIG. 4 shows a protective profiled element 9 in the form of a tube, thereby enabling a particularly soft edge to be obtained. The tube may be of spun material or be formed in one piece of plastics material.

If the protective profiled element consists of a plastics material suitable for the purpose, it may be welded to the edge of the belting. (FIG. 2). The protective profiled element may also be attached by sewing, which is always expedient when the material from which it is formed is not suitable for welding.

As FIG. 2 shows, the protective profiled element has a diameter which is smaller than the thickness of the belting 1, or is at most equal to this thickness. It is attached in such a manner that its axis lies in the imaginary central transverse plane 20 of the belting. The protective profiled element should therefore not project transversely of the plane of the belting, since this would hinder the functioning of a winding device on which it was wound.

Figure 6:
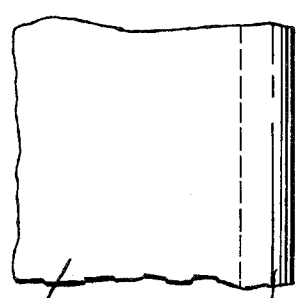
Figure 7:
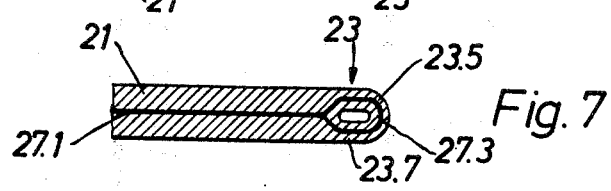
FIG. 7 is a corresponding, highly diagrammatic, cross-section.

In FIGS. 6 and 7 a belt portion 21 and an integral woven tubular portion 23 which forms the profiled protective element of the belting can be seen. In the belt portion 21 the weft threads 27.1 extend in the central plane. In the tubular portion 23 each weft thread makes a loop 27.3. The tubular portion has an upper wall 23.5 and a lower wall 23.7 in the aspect of the drawing.

Figure 8:
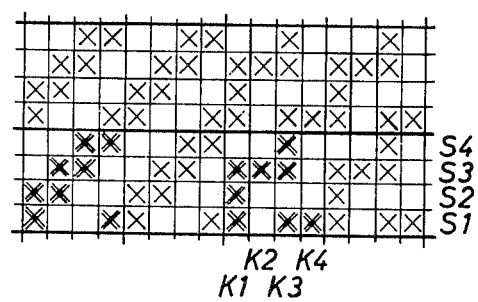
FIG. 8 shows part of a pattern for belting according to the invention with half weft density in the protective profiled element in comparison with the belt portion thereof.

FIG. 8 shows part of a pattern for the weaving of belting provided with a tube tubular portion 23. FIG. 8 shows the portion which is of interest at the transition from the belt portion 21 to the tubular portion 23. The complete pattern is obtained by continuation of the pattern in both directions. An x means that at this point the warp thread lies at the top. The repeat is indicated in each case by x signs in double lines.

A side margin of the belt portion 21 can be seen. A twill weave K $\frac{2}{2}$ z is shown. This is continued to the left and alternates in stripes with a twill weave K $\frac{2}{2}$ s, whereby belting having a striped pattern is obtained. A part of the tubular portion 23 is also shown. As can be seen, the first warp thread has a weave $\frac{3}{1}$, the next warp thread a weave $\frac{1}{3}$, which is followed again by a weave $\frac{3}{1}$, but this is offset in relation to the first weave of this kind, and so on. A hollow tube is obtained whose diameter depends on the length of the pattern.

In the pattern successive weft threads are designated S1 to S4 and the four warp threads on the left in the tubular portion 23 are designated K1 to K4. The warp threads K1 and K3 form the upper wall of the tube. They are interlaced only with the weft thread S4 or S2, that is to say only by each alternate weft thread. If only the interlacing points of the two warp and weft threads mentioned are considered, a linen weave L $\frac{1}{1}$ is obtained as the interlacing of the warp and weft threads in the upper wall of the tube. The situation is similar for the bottom wall of the tube. The warp threads K2 and K4 serve only to form the bottom wall of the tube and interlace with the weft threads S3 and S1 respectively. Here again there is a linen weave L $\frac{1}{1}$.

For the formation of the tubular portion 23, no more wefts are required than for forming the belt portion 21. The consequence is however that the tubular portion has only half the weft density compared with the belt portion. This produces a very soft edge, which protects against abrasion the clothes of a person wearing the belt and protects unclothed parts of the body of the person in question against injury by cutting.

For the weft threads use is made of a filament yarn which in the belt portion has a fineness of, for example, 1100 dtex, but in the tubular region is of greater fineness, for example about twice that of the yarn of the belt portion.

Figure 9:
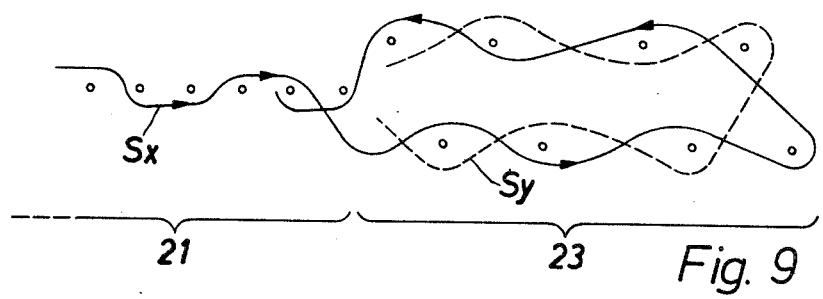
FIG. 9 is a warp section through the margin of belting of this kind.

FIG. 9 shows in a simplified warp section the side margin of belting with a weave of the kind shown in FIG. 8, although for the sake of simplicity only a very thin tube utilising eight warp threads has been shown. It can be seen that in the case of weft insertion to the right the weft thread Sx forms only the bottom wall of the tube, and in the case of weft insertion towards the left it forms only the upper wall of the tube. The next two wefts have also been shown in the drawing in dashed lines as Sy.

Figure 10:
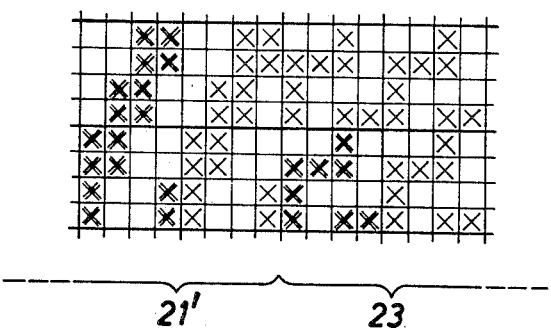
FIG. 10 shows part of a pattern for belting with equal weft densities in the belt portion and protective profiled element.

FIG. 10 shows part of a pattern for a belt in which the tubular portion has the same weft density as the belt portion. The tubular portion 23 has the same weave as in FIG. 8. The twill weave in the belt portion 21' is however different. It comprises K $\frac{4}{4}$ z (and obviously merges further to the left into a corresponding S-rib twill weave). It can be seen that for the belt portion 21' the flattening remains the same during two successive wefts. The weft threads are in each case interlaced at the right and left edges in the tubular portion 23. In the belt portion 21', however, two successive wefts remain untied side by side. In the case of a shuttle loom these are two weft threads, and in the case of a needle belt weaving loom four weft threads. Of the two successive wefts, one interlaces in the upper wall of the tube and the other in the lower wall of the tube. In this manner belting is obtained in which the tubular portion has the same weft density as the belt portion.

It has been stated above that warp threads having different coefficients of elongation at break are preferably used for the belt portion and for the tubular portion. The warp threads of the tubular portion should have a higher coefficient of elongation at break than those of the belt portion, which can for example be achieved by shrinking the warp threads of the tubular portion to a greater extent than those of the belt portion. The following is an example of this: For the production of belting of this kind, the following yarns made by ENKA-Glanzstoff were used:

|  | Warp threads | | Weft threads |
|---|---|---|---|
|  | Belt portion | Tubular portion |  |
| Name of product | ENKALON (R) High Tenacity Yarn | | DIOLEN (R) High Tenacity Yarn |
| Type | 149 HR | 431 HR | 56 |
| Material | Black polyamide 6 | | Polyester |
| Fineness dtex | 940 | 470 | 550 |
| Fibres (filaments) | 60 | 72 | 96 |
| Coefficient of elongation at break % | 19 | 21.5 | 11.5 |
| Hot air shrinkability 15 min - 190° C % | 9 | 11.5 | 21.0 |

Before weaving, the warp threads for the tubular portion 23 were shrunk by about 4%. The belt portion 22 is given 220 warp threads, each of which is double.

Each of the two tubular portions is given 20 single threads. 87 wefts were inserted for each 100 mm of belt portion. The tubular portions have half the weft density, that is to say 43.5 wefts per 100 mm.

After weaving, the entire belting was shrunk by about 2.5% in hot air. In the belting finished in this manner the warp threads have the following actual lengths:

| in the belt portion 21 | 109 mm |
|---|---|
| in the tubular portion 23 | 192 mm |
| length ratio is therefore about | 7 %. |

From the above table it can be seen that in the threads as delivered the coefficient of elongation at break of the warp threads of the tubular portion was about 2.5% higher than that of the warp threads of the belt portion. Through the shrinking of the warp threads of the tubular portion to the extent of 4% their coefficient of elongation at break was increased by about 4%, so that the two coefficients of elongation at break varied by about 6.5%, that is to say approximately the 7% of the ratio of the actual length of the threads.

In strength tests the belting broke simultaneously over its entire width with a breaking load of 2,650 kp.

As previously stated, different coefficients of elongation at break can be obtained with two threads having otherwise identical properties by twisting one thread or its plys, namely the yarns of twists of which it is composed, to a greater extent than the other thread of its plys.

In this way separate shrinking or stretching is not necessary to obtain the desired coefficients of elongation at break. For a thread manufacturer it is usually easier to twist yarns to a greater or lesser extent during spinning, in accordance with customers' requirements, than to shrink or stretch yarns subsequently. The same is true of threads formed by twisting from a plurality of yarns or twists.

The extent to which one thread or its plys must be more intensively twisted than the other thread or its plys, that is to say the extent to which the coefficient of twist must be higher, in order to achieve a determined ratio of coefficients of elongation at break, can easily be determined by the specialist and therefore need not be further explained here.

It has been found that the warp threads in the margins of safety belts deteriorate in respect of breaking strength, that is to say require lower coefficients of elongation at break, when subjected to chafing over a long period of time. This effect can be compensated by shrinking or twisting the warp threads of the tubular portions to a slightly greater extent than would otherwise be necessary.

What is claimed is:

1. Woven belting for safety belts including:
    a longitudinally extending, single layer woven belt portion of textile material having warp and weft threads and having opposite longitudinal side margins, and
    at least one protective profiled element extending along one of said side margins,
    said protective profiled element being in the form of a woven tube of textile material having warp and weft threads and a weave in which $\frac{3}{1}$ alternates with $\frac{1}{3}$,
    said protective element being integral with said belt portion with said woven tube and belt portion having common weft threads,
    wherein the coefficients of elongation at break of the warp threads of the said element are higher by a percentage $a$ than the coefficients of elongation at break of the warp threads of the belt portion and the percentage $a$ is at least substantially equal to a percentage $b$ by which in a predetermined length of belting the actual lengths of the warp threads of the belt portion are greater than the actual lengths of the warp threads of the said element.

2. Belting according to claim 1, wherein the protective profiled element has a cross-section which is rounded at least over that part of its periphery which does not abut the belt portion of the belting.

3. Belting according to claim 1, wherein the protective profiled element has a thickness which is no greater than that of the belt portion of the belting and wherein the protective profiled element does not project beyond either major surface of the belt portion.

4. Belting according to claim 1, wherein the protective profiled element has a lower weft density than that of the woven belt portion.

5. Belting according to claim 1, wherein the protective profiled element has half the weft density of the woven belt portion, the belt portion of the belting having a $\frac{2}{2}$ weave with single weft insertion per shedding.

6. Belting according to claim 1, wherein the belt portion and the protective profiled element have the same weft density.

7. Belting according to claim 1, wherein the warp threads of the protective profiled element are finer than those of the belt portion.

8. Belting according to claim 1, wherein the belt portion and said element are woven from warp threads whose coefficients of elongation at break originally differed by a percentage different from the percentage $b$, but which, before weaving, have been treated by so shrinking the warp threads of the said element that the resulting coefficients of elongation at break of the warp threads of the said element are greater than those of the warp threads of the belt portion by at least substantially the percentage $b$.

9. Belting according to claim 1, wherein the belt portion and said element are woven from warp threads whose coefficients of elongation at break originally differed by a percentage different from the percentage $b$, but which, before weaving, have been treated by so stretching the warp threads of the belt portion that the resulting coefficients of elongation at break of the warp threads of the said element are greater than those of the warp threads of the belt portion by at least substantially the percentage $b$.

10. Belting according to claim 1, wherein the belt portion and said element are woven from warp threads whose coefficients of elongation at break originally differed by a percentage different from the percentage $b$, but which, before weaving, have been treated by so shrinking the warp threads of the said element and so stretching the warp threads of the belt portion that the resulting coefficients of elongation at break of the warp threads of the said element are greater than those of the warp threads of the belt portion by at least substantially the percentage $b$.

11. Belting according to claim 1, wherein the warp threads or the plys thereof, of said element have a different degree of twist to the warp threads, or the plys thereof, of the belt portion, the differences in the degrees of twist being such as to provide said different coefficients of elongation.

12. Belting according to claim 4, wherein the protective profiled element has half the weft density of the woven belt portion.

13. Belting according to claim 6, wherein the belt portion has a $\frac{4}{4}$ weave with double weft insertion per shedding.

14. Belting according to claim 11, wherein the warp threads, or the plys thereof, of said element are twisted to a greater extent than the warp threads, or the plys thereof, of the belt portion.

15. Woven belting for safety belts including:
a woven flat single layer belt portion having integral opposite side rims in the form of tube portions,
said belt and tube portions having warp and weft threads,
the dimensions and coefficients of elongation at break of the warp threads of both the said belt and tube portions being predetermined so that they are chargeable up to about the same charge of break.

* * * * *